(No Model.) 8 Sheets—Sheet 1.

C. B. RUSSELL.
TACK OR NAIL MAKING MACHINE.

No. 583,420. Patented May 25, 1897.

Fig. 1.

Witnesses:
Walter E. Lombard
Thomas J. Drummond

Inventor:
Charles B. Russell,
by Crosby & Gregory
Atty.

(No Model.) 8 Sheets—Sheet 4.
C. B. RUSSELL.
TACK OR NAIL MAKING MACHINE.

No. 583,420. Patented May 25, 1897.

Fig. 4.

Witnesses:
Walter E. Lombard.
Thomas J. Drummond.

Inventor:
Charles B. Russell,
by Crosby & Gregory
Atty.

(No Model.) 8 Sheets—Sheet 6.
C. B. RUSSELL.
TACK OR NAIL MAKING MACHINE.

No. 583,420. Patented May 25, 1897.

Witnesses:
Walter E Lombard
Thomas J Drummond

Inventor:
Charles B. Russell,
by Crosby & Gregory
Atty.

(No Model.) 8 Sheets—Sheet 7.

C. B. RUSSELL.
TACK OR NAIL MAKING MACHINE.

No. 583,420. Patented May 25, 1897.

Witnesses:
Walter E. Lombard
Thomas J. Drummond

Inventor:
Charles B. Russell,
by Crosby & Gregory
Atty.

UNITED STATES PATENT OFFICE.

CHARLES B. RUSSELL, OF HANOVER, MASSACHUSETTS, ASSIGNOR OF ONE-HALF TO RODOLPHUS C. WATERMAN, OF SAME PLACE.

TACK OR NAIL MAKING MACHINE.

SPECIFICATION forming part of Letters Patent No. 583,420, dated May 25, 1897.

Application filed May 7, 1896. Serial No. 590,538. (No model.)

*To all whom it may concern:*

Be it known that I, CHARLES B. RUSSELL, of Hanover, county of Plymouth, State of Massachusetts, have invented an Improvement in Tack or Nail Making Machines, of which the following description, in connection with the accompanying drawings, is a specification, like letters on the drawings representing like parts.

My invention relates to machines for the manufacture of tacks, nails, &c., and has for its primary object the production of tacks, nails, &c., from a continuous wire without waste of material, the tacks, nails, &c., thus formed being also stronger, stiffer, and smoother than those that are made from plate metal.

According to my invention the wire or stock from which the tacks are to be formed is fed from a reel or other proper support in a continuous strip and delivered alternately to one and the other of two cutting and forming mechanisms, so that when one mechanism is forming the tack the other mechanism has finished the tack which it held and is cutting another one, the latter to be formed in turn while the wire is being shifted over and fed to the first mechanism again. By this means the tacks can be produced with great rapidity without sacrificing precision of operation and perfection of finish.

My invention will be more fully understood from the detailed description thereof hereinafter, taken in connection with the accompanying drawings, illustrative thereof.

The mechanism herein shown as constituting one embodiment of my invention is mounted upon a suitable frame consisting, in the present instance, of front and rear standards A A, connected together near their lower ends by convenient tie-braces A' A' and joined together by and supporting at their upper ends the base-plates $A^2$ $A^3$ at either side thereof, said plates, for convenience, being bolted together at $a$ $a$ at their inner meeting edges.

The base-plates $A^2$ $A^3$, by means of the journal-brackets $J^4$ $J^4$ at either end thereof and by means of the central bracket $A^4$, extending from the meeting edges thereof at the front of the machine, support the working parts of my invention. The latter may be conveniently considered in three groups—to wit, the two tack or nail forming mechanisms, one at either side of the machine and operated, respectively, by the shafts D and H, journaled in the brackets $J^4$ $J^4$, and the wire-feeding mechanism at the front of the machine between the two tack-forming mechanisms and supported on the bracket $A^4$.

The wire $w$ passes to the feeding mechanism from a suitable reel (not shown) and is fed first to one forming mechanism and then to the other by suitable means. In the preferred embodiment of my invention herein shown the said means comprises a bodily reciprocating movement sidewise and also a swinging or oscillating movement, although I do not restrict my invention to these two movements, as either one may be omitted or others substituted.

Figures 9, 10, 11, 12, 13, 14, 15, 16:
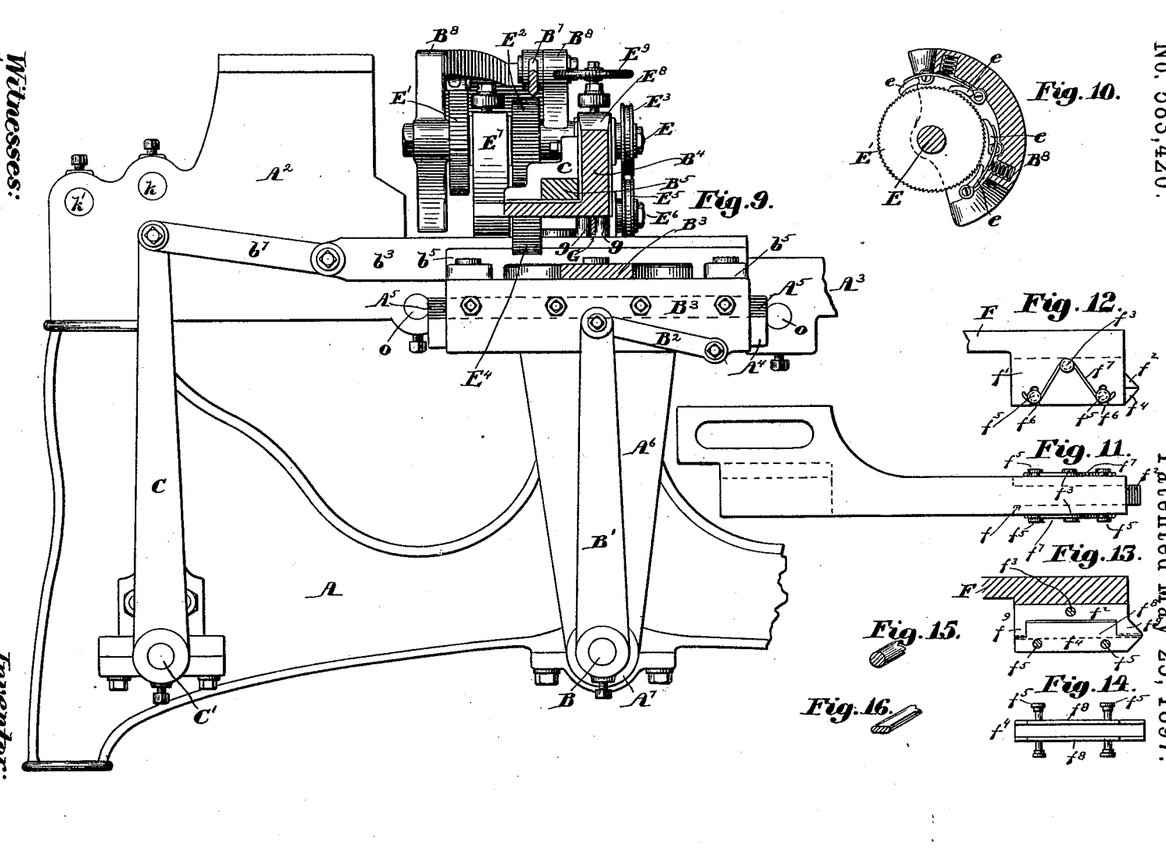
Fig. 9 is an enlarged partial sectional elevation looking toward the rear of the machine, taken on the line 9 9, Fig. 1.
Fig. 10 is a sectional detail of the feeding-shaft and its operating mechanism drawn to the same scale as Fig. 9.
Figs. 11, 12, 13, and 14 show enlarged details of the wire-guide.
Figs. 15 and 16 are fragmentary views of the wire before and after being subjected to the action of the pressure-rolls.

On the forward end of the bracket $A^4$ a slide $B^3$ is mounted to move back and forth laterally by a suitable connection, as by the dovetailed guideway $A^5$, fitting into a similar dovetailed recess formed in the slide $B^3$, (see Fig. 5,) being so reciprocated by means of the rocker-arm $B'$ and link $B^2$, Fig. 9.

Figure 2:
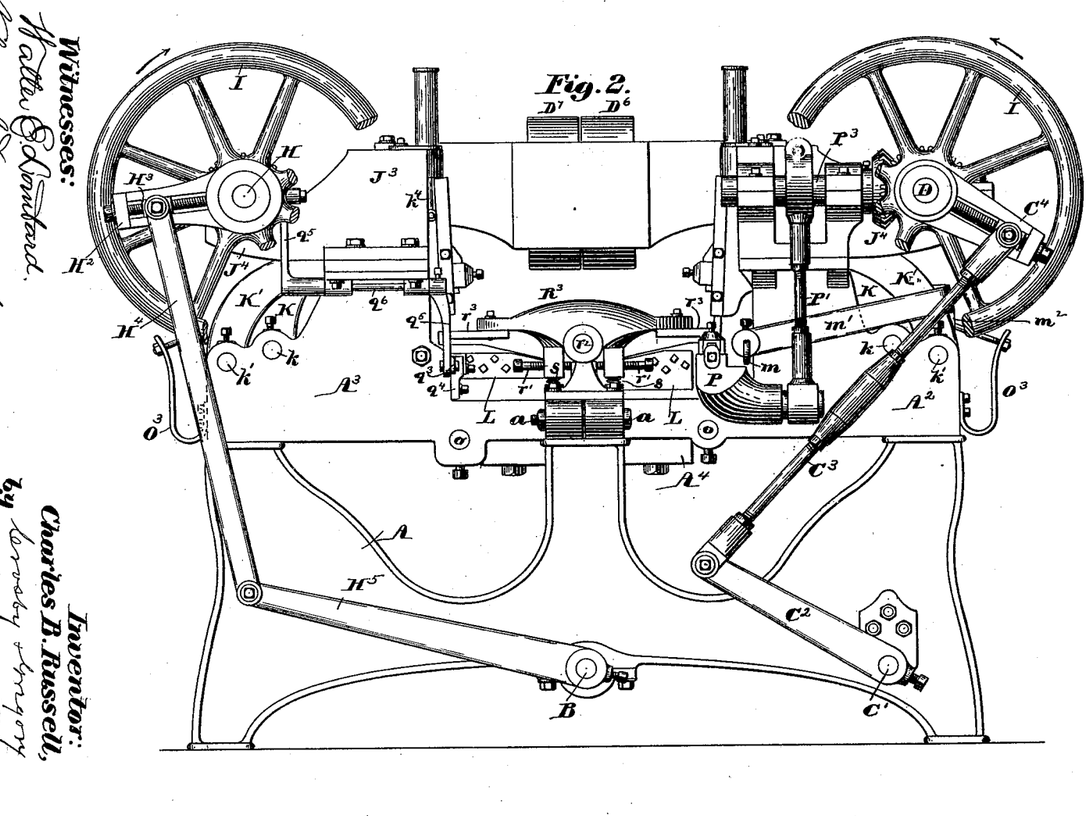
Fig. 2 is a rear elevation thereof.
Figures 5, 6:
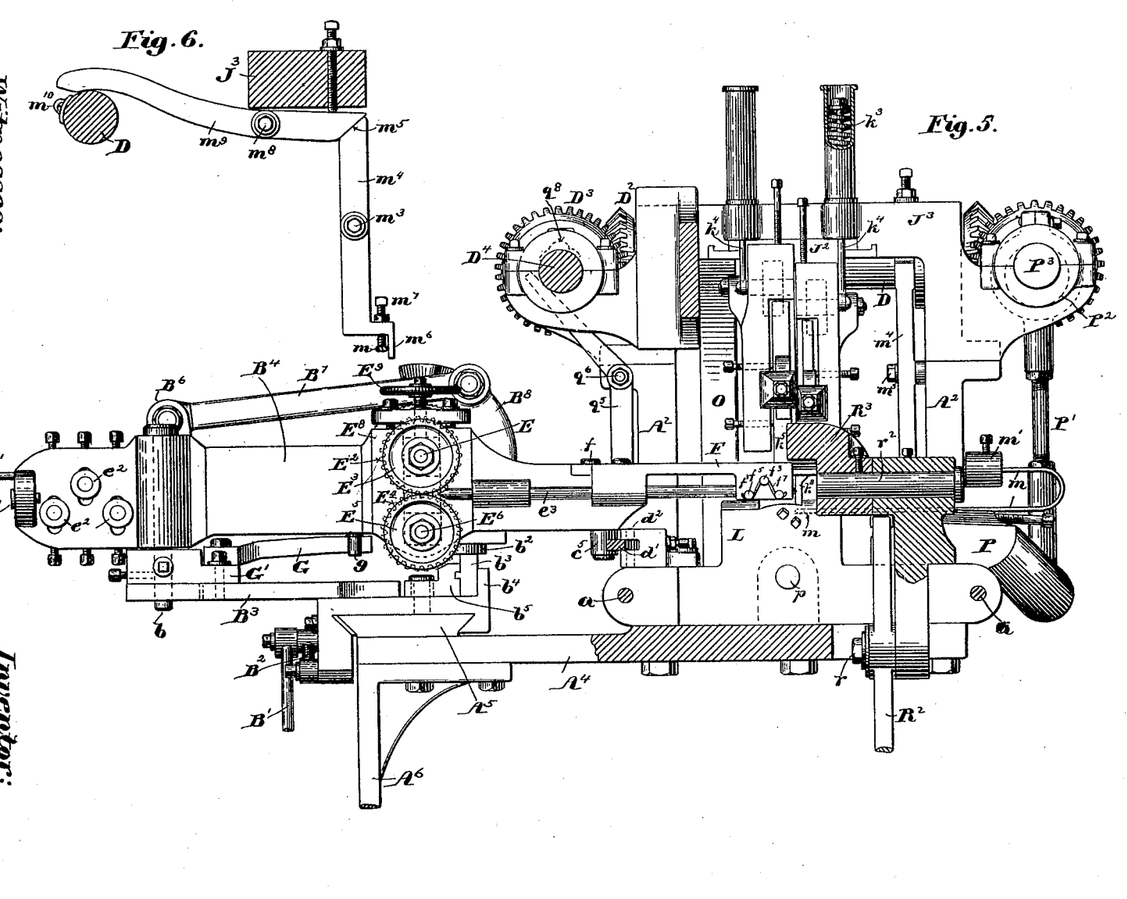
Fig. 5 is an enlarged sectional elevation of the upper part of the machine, looking toward the left, taken on the line 5 5, Fig. 1.
Fig. 6 is an enlarged detail showing, partly in section, the devices for operating the lower blank-holding finger.

The rock-shaft B carries the arm $B'$ and is suitably journaled in the standards A A and in a bearing $A^7$ of the hanger $A^6$, Figs. 2 and 9, secured to the bracket $A^4$, Fig. 5.

Figure 1:
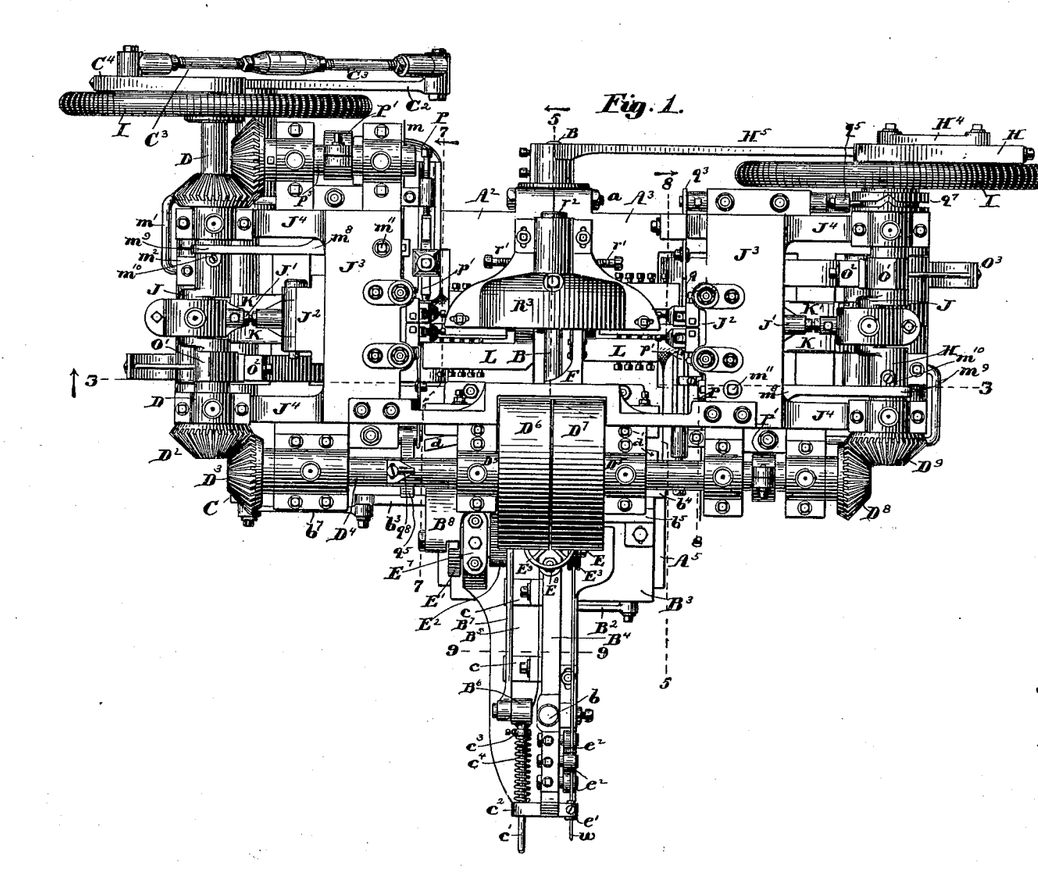
Figure 1 is a plan view of the complete machine embodying my invention.
Figure 4:
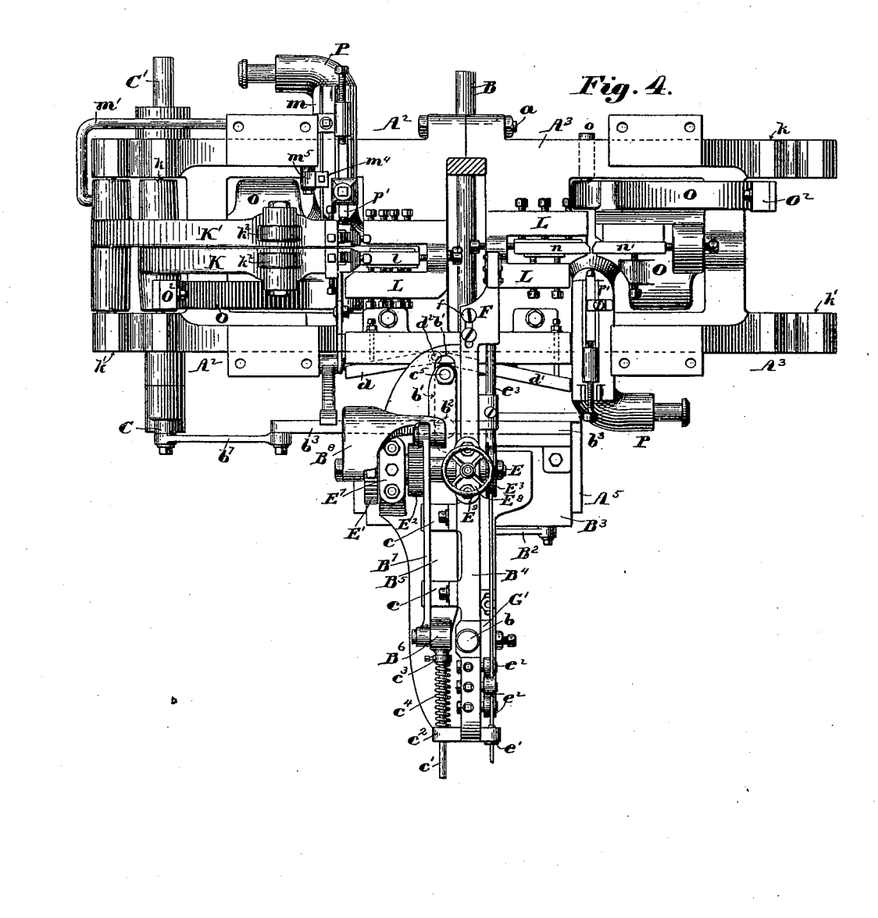
Fig. 4 is a plan view of the machine, omitting the upper portions of the frame and the operating mechanism, the cutting and holding jaws being also omitted, at the right side of the figure.

The wire-feeding carriage $B^4$ is preferably pivotally mounted at $b$ on the slide $B^3$, Figs. 4 and 5, being provided at its rear under side with a slot $b'$ to receive the roll $b^2$ of the oscillator-bar $b^3$. The latter in the present instance reciprocates in a way formed by a projection $b^4$ from the slide $B^3$ and an adjustable block $b^5$, the necessary reciprocating motion being given to the bar $b^3$ by means of a rock-shaft $C'$, arm C, and link $b^7$, Fig. 9. The rock-shaft $C'$ is adjustably connected at its rear end, Figs. 1 and 2, to the shaft D by means of a crank $C^2$ and pitman $C^3$, the latter having radial adjustment relatively to the shaft D by a nut-and-screw connection carried by the arm $C^4$, revolving with the shaft D, this adjustment serving to vary the stroke of the crank $C^2$ and thereby the amount of reciprocation of the oscillator-bar $b^3$ and carriage $B^4$. The rock-shaft B, before mentioned, is operated by a similar connection with the shaft H, the arm $H^2$ of the shaft H carrying an adjusting-screw and a nut $H^3$ to radially move the upper end of pitman $H^4$, thereby correspondingly altering the stroke of crank $H^5$ and the consequent movement of the rock-shaft B, arm $B'$, slide $B^3$, and the supported parts thereon.

The carriage $B^4$ has longitudinally movable thereon in bearings $c\ c$ a sliding bar $B^5$, having at its rear end a friction-roller $c^5$, which is normally held in yielding engagement against the adjustable feed-regulators $d\ d'$, Fig. 4, by suitable means, as by the coiled spring $c^4$, mounted between the shoulder $c^2$ and collar $c^3$ on a rod $c'$, projecting, preferably, from the upturned end $B^6$ of the bar $B^5$.

As the rear end of the carriage $B^4$ is oscillated or otherwise moved from one side of the machine toward the other the roller $c^5$ rides on one or the other of the feed-regulators $d\ d'$, correspondingly reciprocating the sliding bar $B^5$ to feed the wire to the machine, which it does by means of the mechanism shown best in Figs. 4, 9, and 10.

Loosely mounted upon the shaft E is a pawl-carrier $B^8$, arranged to be rocked back and forth by the rod $B^7$, pivotally connected to the end $B^6$ of the sliding bar $B^5$, said carrier $B^8$ being provided with suitable clutching means to engage and turn the shaft E on the rearward movement thereof, such means being shown as preferably a ratchet-wheel $E'$, fixed to shaft E, and a plurality of spring-pressed pawls $e$ on the pawl-carrier $B^8$ and arranged out of step with the teeth of the ratchet-wheel. (See Fig. 10.)

The shaft E carries at its outer end a feed-roll $E^3$, arranged to coöperate with a second feed-roll $E^5$ on shaft $E^6$, the latter being driven by means of a gear $E^4$, meshing with a gear $E^2$, keyed to shaft E. These feed-rolls also preferably act as pressure-rolls, for a purpose more fully set forth later on.

The shafts E $E^6$ are mounted in suitable sliding journal-boxes mounted in guideways in the upward projections $E^7 E^8$ of the carriage $B^4$, thus permitting the pressure-rolls $E^3 E^5$ to be moved toward or from each other by the adjusting-wheel $E^9$ to give a greater or less amount of pressure to the wire as it passes between the rolls.

The wire first passes to the machine from a suitable reel (not shown) through the thimble $e'$, between the straightening-rolls $e^2\ e^2$, and then to the pressure-rolls $E^3\ E^5$, where it is flattened, as shown in Fig. 16, and from which it passes through the tube or other support $e^3$ to the nose-piece F, adjustably attached at $f$ to the rear end of the carriage $B^4$ and provided at its rear end with an accurate guide for the wire, preferably removable in part and herein shown as supported by a slotted downward projection $f'$, in which slot is mounted the upper jaw $f^2$ of the wire-guide, secured therein by a pin $f^3$, projecting through and beyond the sides of said mouthpiece, Figs. 12 to 14. Beneath the jaw $f^2$ is mounted a movable under jaw $f^4$, provided with the pins $f^5\ f^5$, projecting through slots $f^6$ in the sides of the mouthpiece F and held in position therein by the springs $f^7 f^7$, the under jaw $f^4$ having, preferably, a projection $f^8$, which extends upward between downward projections $f^9\ f^9$ of the upper jaw $f^2$ to prevent endwise movement. The wire in passing from the feed-rolls passes between these jaws, the tension of the springs $f^7$ being sufficient to afford a suitable hold upon the wire at the point where it is to be presented to the cutting-jaws, while at the same time the jaws may yield to allow the passage of wire of varying thicknesses. These jaws are changed for others for varying widths of wires.

The carriage $B^4$ is preferably held in its normal position, as indicated in the drawings, by means of the spring G, projecting from the block $G'$, adjustably secured to the slide $B^3$, said spring extending at its free end between the antifriction-rolls $g$, depending from the carriage $B^4$. The tension of said spring is such as to cause said carriage to resume its normal position as soon as the power has been removed, thus relieving the arm C of a considerable portion of the strain thereon.

I have shown the two tack or nail forming mechanisms as continuously operated from the end shafts D and H, each provided with suitable balance-wheels I and geared, respectively, by the bevel-gears $D^2 D^9$ to the bevel-gears $D^3$ $D^8$ of the drive-shaft $D^4$, the latter having usual fast and loose pulleys $D^6$ $D^7$. This arrangement of shafts and gears is compact and powerful, but my invention is in no wise limited to the same nor to the details thereof.

Figures 17, 18, 19, 20, 21, 22, 23, 26:
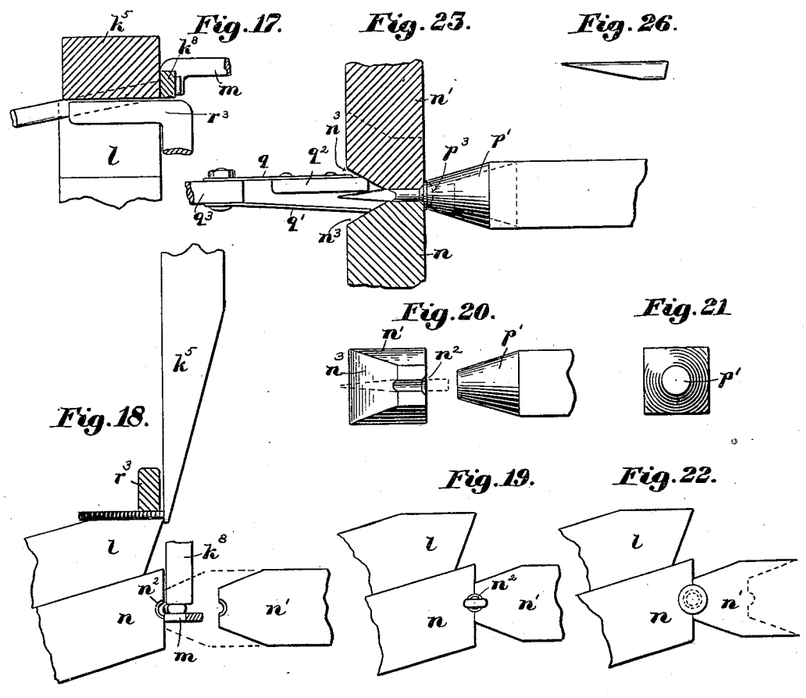
Figs. 17 to 25 show enlarged details of the devices for cutting and holding the wire and for gripping, conveying, and compressing the blank and for forming the head thereon, as more fully described hereinafter.
Fig. 26 represents a blank cut from the flattened wire.
Figures 24, 25:
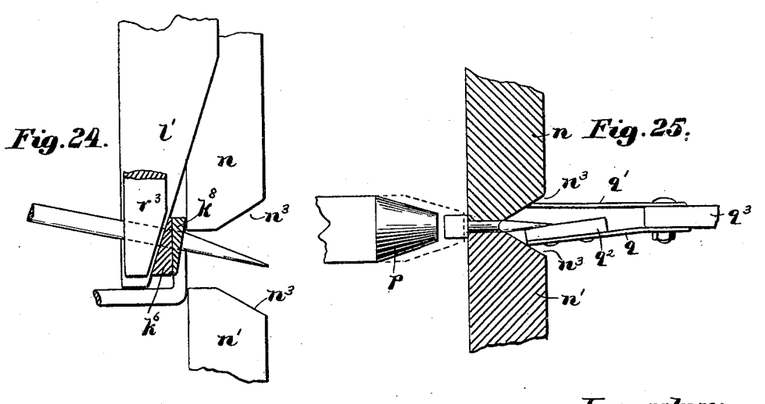

As the flattened wire, Fig. 16, is delivered to one forming mechanism or the other it is firmly clamped by the holder $r^3$ against the fixed cutter $l$ or $l'$, (see Figs. 7, 8, 17, and 24,) while the movable cutting-tool $k^5$ or $k^6$ descends and cuts off a portion of the wire to be formed into a tack or nail, this portion of wire or blank being seized at the same moment between the carrier $k^8$ and spring-finger $m$ and carried thereby into position between the gripping-tools $n$ $n'$, Fig. 18, which thereupon grip the same, forming the shank of the tack or nail, Figs. 23 and 25, after which the header $p$ or $p'$ completes the tack or nail by forming the head. All these operations are accomplished in quick succession, the tacks being formed at a very high speed. The details of the forming mechanisms will now be explained.

Each shaft D and H is provided with a crank J, which is connected by an adjustable connection $J'$ to a wedge-block $J^2$, mounted in ways in the under side of the cross-bar $J^3$, (see Figs. 3, 7, and 8,) these wedge-blocks serving to operate the cutting-jaws K and the carrier-jaws $K'$, said jaws being suitably pivoted to the base-plates at $k$ $k'$ and having their rolls $k^2$ held in yielding contact with the wedge-blocks by suitable means, as by the compression-springs $k^3$ and rod $k^4$, pivoted to the free ends of said jaws. The inclines $j$ of the wedge-blocks are shorter on the front side, the shorter portion of the respective inclines coöperating with the roll $k^2$ of the cutting-jaw K and the longer portion of the incline coöperating with the roll $k^2$ of the carrier-jaw $K'$, the object being to cause the incline $j$ to act upon the rolls $k^2$ of both jaws K $K'$ and force the said jaws downward, the incline at the front side being sufficient to operate the jaw K a distance to permit the cutting-tool $k^5$ or $k^6$, held thereby, to coöperate with the fixed cutter $l$ or $l'$, secured in a suitable box $t$ on the base-plates and cut the wire, the roll $k^2$ of the cutting-jaw K then entering the dwell $k^7$, the carrier $k^8$ of the carrier-jaw $K'$ having at the same moment clamped the head of the blank against the spring-finger $m$ just as the said blank was severed from the wire. The further inward movement of the wedge-block forces the carrier-jaw $K'$ downward, carrying the blank into position between the fixed gripping-tool $n$, mounted in the block L, and the movable gripping-tool $n'$, mounted in the arm O.

The arms O are pivotally supported at their lower ends at $o$ in the frame of the machine and are operated by the cams $O'$ bearing against their upper ends $O^2$, which are held in engagement therewith by means of the springs $O^3$. The cams $O'$ and the tools $n'$ are preferably adjusted so as not only to grip the blank, but also to compress the same into the desired round or other shape preferred for the finished tack or nail.

If the tack or nail were formed simply as above stated, the point thereof would not be centered properly, the blank having been cut diagonally, as shown in Figs. 17 and 26. Therefore in order to properly center the point and otherwise form the point end of the tack or nail I have herein shown the tools $n$ $n'$ as beveled at their rear sides, Figs. 23 and 25, to receive the spring-arms $q$ $q'$, the former being provided with the block $q^2$ to crowd the adjacent portion of the tack or nail blank over into properly-centered position as the gripping-tool $n'$ grips and compresses the said blank.

Various other devices may be substituted for properly centering the points of the product, or the die ends of the gripping-tools may be formed to accomplish the desired result, but I prefer the means shown, using the same also for another purpose presently to be described.

When the gripping-tools $n$ $n'$ seize the shank of the blank, as described, the carrier and cutter-jaws $K'$ K are drawn back to their original positions and the spring-finger $m$, which held the under side of the head of the blank, Figs. 17 and 18, is moved laterally out of the way of the header $p$ or $p'$ and so that it may also resume its original position to receive another blank at the proper time.

The spring-finger $m$ (see Figs. 8, 4, and 6) is herein shown as adjustably supported in an arm $m'$, the latter being adjustably secured at $m^2$. Pivoted at $m^3$ is a lever $m^4$, provided at its upper end with an inclined surface $m^5$, while its lower end is bent inwardly and downwardly, said downward projection $m^6$ bearing against the inner edge of the spring-finger $m$, an adjusting-screw $m^7$, bearing upon the top of said spring-finger $m$, serving to regulate the vertical position of the operating end thereof. Coöperating with the surface $m^5$ is a lever $m^9$, pivoted at $m^8$ and actuated by the cam projection $m^{10}$ to force the lower end of the lever $m^4$ outward, thereby moving the spring-finger $m$ from beneath the head of the blank, as desired. The usual headers P, pivoted at $p$, are operated by rod connections $P'$ to eccentrics $P^2$, Figs. 7 and 8, on the shafts $P^3$ and $D^4$, the opposing surfaces of the headers and gripping-tools being preferably countersunk at $p^3$ and $n^2$, respectively, to form the rounded and flanged head, (shown best in Fig. 23,) or the head may be flat, as indicated in Fig. 25, or rounded on one side, as in Fig. 20, or any other shape desired. The head having been formed on the previously rounded and centered shank, the completed tack or nail is ejected from the gripping-tools by suitable means, the spring-arms $q$ $q'$, before referred to, being preferably employed for this purpose. These spring-arms $q$ $q'$ are secured to a reciprocable bar $q^3$, (see Figs. 7 and 8,) mounted under a strap $q^4$ and connected at its outer end with the lever $q^5$, pivoted at $q^6$ to the frame.

Figure 7:
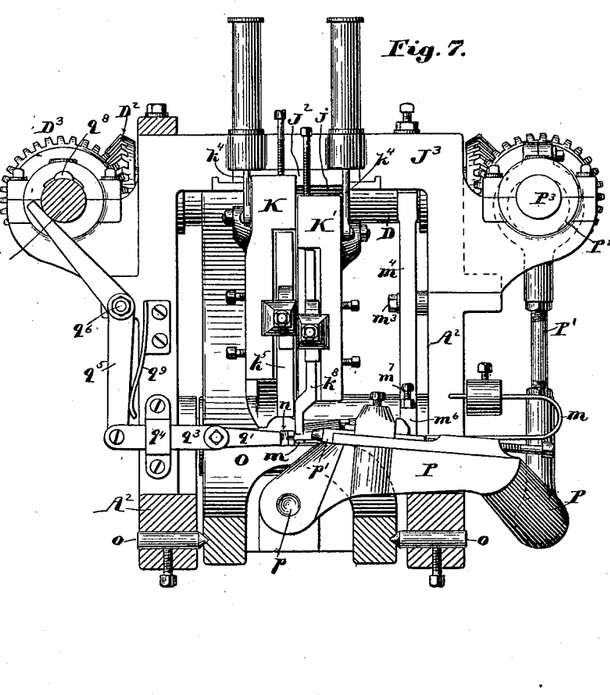
Figs. 7 and 8 are sectional views similar to and drawn to the same scale as Fig. 5 and looking, respectively, toward the left and right of the machine, the sections being taken, respectively, on lines 7 7 and 8 8 of Fig. 1.
Figure 8:
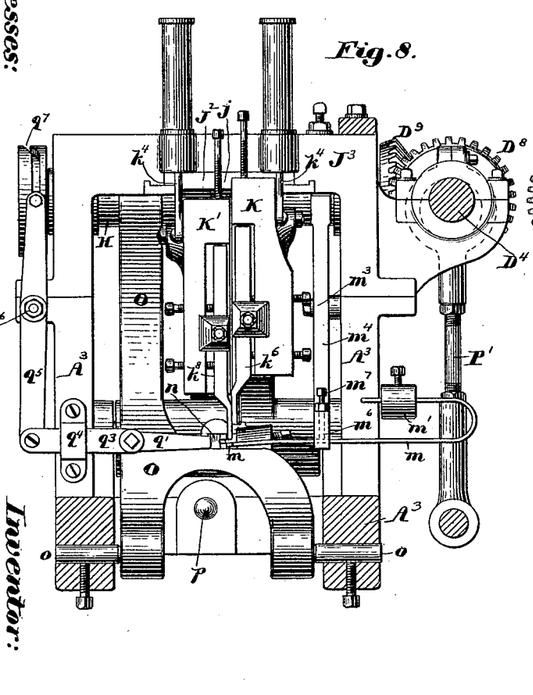

The lever $q^5$ may be operated by a path-cam $q^7$ on the shaft H, as shown in Fig. 8, or may be operated by the cam projection $q^8$, adjustably secured to the shaft $D^4$, as shown in Fig. 7, a spring $q^9$ maintaining said lever against said shaft, the resulting forward movement of the arms $q$ $q'$ being sufficient to dislodge the tacks from the gripping-tools and permit the same to fall into a chute or other receptacle. (Not shown.)

Figure 3:
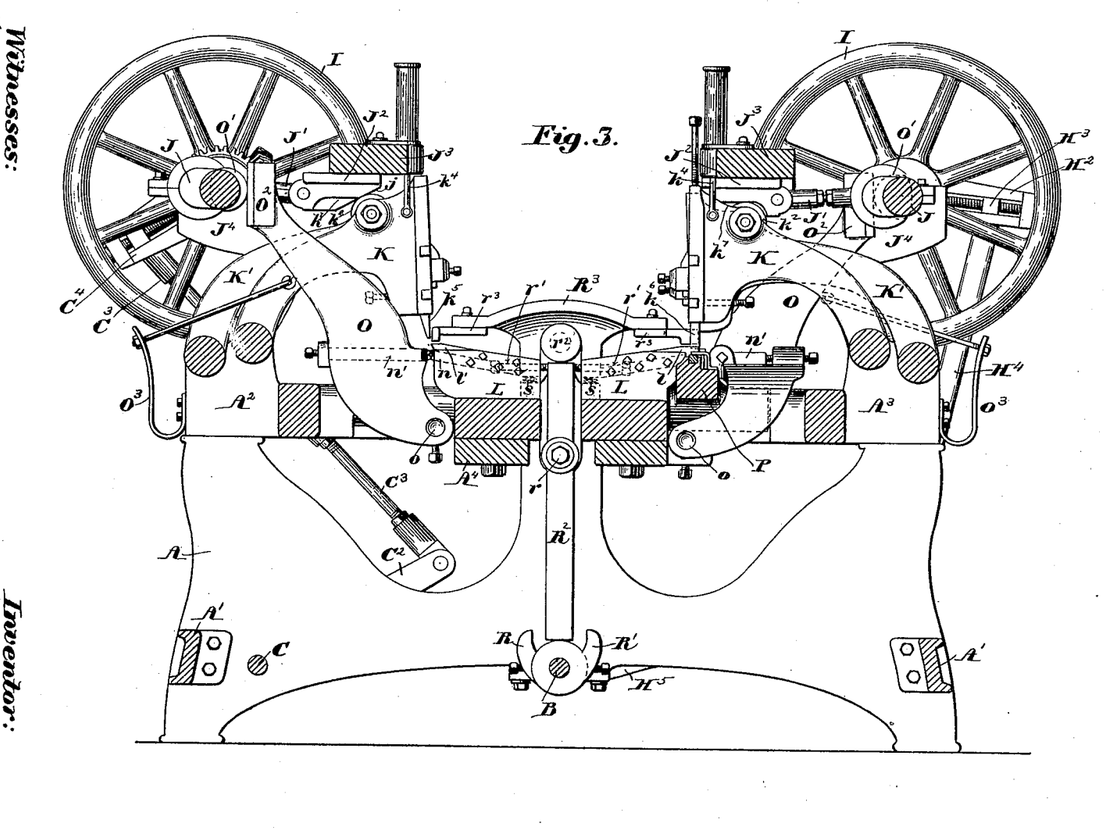
Fig. 3 is a sectional elevation of the same, looking toward the rear, taken on the line 3 3 of Fig. 1.

Referring to Figs. 2 and 3, it will be seen that the holders $r^3$, carried at either end of a rocker-head $R^3$, centrally pivoted at $r^2$, are normally held in raised position, as shown, by suitable means, as by the springs $s$.

The shaft B has adjustably fixed thereon two spur-collars R R', Fig. 3, arranged to contact alternately, as the shaft is rocked, with a lever $R^2$, which is pivoted at $r$ and projects upwardly loosely between the adjusting-screws $r'$ $r'$. The collars R R' are so adjusted that just as the carriage $B^4$ has oscillated to the extreme right or left, delivering the wire in proper position between the fixed cutter and the holder $r^3$, the spur of the opposite collar R or R' strikes against the lever $R^2$, thereby rocking the head $R^3$ on its pivot and bringing down the holder $r^3$ firmly against the wire, releasing the same by the initial return movement of the carriage $B^4$. The screws $r'$, being adjustable, accommodate the holders $r^3$ to different thicknesses and shapes of wire.

In the preferred construction of my invention, as herein shown, the left-hand cutting mechanism is arranged to cut the wire obliquely, as indicated in Fig. 17, with the point of the blank formed thereby facing the front of the machine, the right-hand cutting mechanism being then arranged to cut the wire transversely, as indicated in Fig. 24, the blank then pointing in an opposite direction away from the front of the machine. By this means all waste is avoided, the tacks or nails being formed longitudinally of the wire and successively in reverse direction. The transverse cut is preferably made somewhat angular, however, with less length of head on the side opposite the point to allow for the crushing effect of the grippers, which spread out the metal on the weaker side of the blank more than on the opposite side, so that after the grippers have acted upon the blank the head end is comparatively straight across. In order to accomplish this above-described oblique and transverse cutting, the mechanisms being as herein shown, it is necessary that more wire should be fed to the left-hand cutting mechanism than to the right-hand cutting mechanism. Accordingly I have provided the adjustable feed-regulators $d$ $d'$, pivoted at $d^2$, and in order that the inclination thereof, and therefore the frictional resistance thereof, may be the same and yet give the differing-feed required I have made the regulator $d'$ longer than the regulator $d$.

By altering the reciprocating movement and position of the slide $D^3$, and correspondingly changing the oscillating swing of the carriage $B^4$, the angle or obliquity of the cut which forms the blank may be varied, as desired. The nearer the pivot $b$ of the carriage $B^4$ is to the center of the machine while the wire is fed to the cutting-tools the greater the angle, while a more acute angular cut is made as said pivot is moved toward the left of the machine. These various adjustments may be accomplished by any ordinary and convenient means, the screw-and-nut means carried by arms $C^4$ and $H^2$ and the adjustable pitman $C^3$ being provided therefor in the present instance, as already explained.

The operation of the machine is as follows: Suitable wire, preferably a round wire, is fed between the straightening-rolls $e^2$ $e^2$ to take out any kinks there may be in the wire, thence between the feed-rolls $E^3$ $E^5$ under sufficient pressure to flatten the wire the required amount, and then to the nose-piece F, from which it will project sufficiently to reach the cutting-tools. The first operation would be to present the wire to the cutting-tools at the right of the machine, where its end would be cut off at the required angle, as has been described. The carriage $B^4$ is then moved to the left and about its pivot $b$, the roll $c^5$, acting on the inclines $d$ $d'$, causing the wire to be fed during the movement, so that when the nose-piece F reaches the opposite position sufficient wire is projecting from said nose-piece to extend across the cutter $l$, as indicated in Fig. 17, to form a blank. The holding-finger $r^3$ then moves down upon the upper surface of the wire just inside the moving cutting-tool $k^5$ and holds the wire firmly while the tool $k^5$ moves downward and cuts the blank. The carrier $k^8$ moves down with the cutting-tool and in conjunction with the spring-arm $m$ seizes the blank at its head end outside the rear face of the cutter $l$ (see Figs. 17 and 18) and conveys it to a lower position in front of the fixed gripping-tool $n$, as shown in Fig. 18. The movable gripping-tool $n'$ on the arm O is then forced from the position shown in full lines, Fig. 18, to the position shown in dotted lines, compressing the blank for a certain portion of its length below the head into a round or other shaped shank, as desired, the same operation forcing the block $q^2$ against the portion of the blank near the point, thereby bending the same so that the point is brought into axial line with the shank of the tack. The gripping having been accomplished, the holding-tool $k^8$ is raised and the spring-finger $m$ is moved outward from beneath the blank, and the heading-tool $p'$ is moved against the larger end of the blank to compress the metal into a flat, round, or other shaped head, a portion of said metal being forced into the countersink $q^2$ of the tools $n$ $n'$ to form a reinforced portion between said head and the shank. The header $p'$ and the gripping-tool $n'$ are then withdrawn, and the spring-fingers $q\ q'$ move in onto the tack and force it from the tools $n\ n'$, permitting it to drop into the receptacle arranged to receive it. The wire is again fed a sufficient distance to cause it to be presented to the cutting-tool $l'$ at the right of the machine in the position shown in Fig. 24. The tool $l'$ is somewhat different from the tool $l$, being arranged to extend across the wire and having its cutting-surface crosswise of the wire, while the coöperating cutting-tool $k^6$ is also arranged to give a cross-cut to the wire, as shown in Fig. 24.

The holding-tool $k^8$ and the spring-finger $m$ of the right-hand mechanism are constructed to seize the blank at a point between the two cuts and convey it to the grippers $n\ n'$, where the completion of the work is practically the same as upon the opposite side of the machine.

It is obvious from the foregoing description that the shape of the tack or nail to be cut on the machine may be varied indefinitely, both as regards length and thickness, while either a short or long point may be made, and heads of any description may be formed by the use of suitably-shaped heading-tools.

By making tacks or nails from a continuous wire there is no waste of material, thereby making a great saving to the manufacturer, also, a much better tack is made, as the shank is lengthwise of the grain of the metal, a tack made from metal plate being cut crosswise of the grain, thereby making a weaker tack. Furthermore, the machine is entirely automatic, thereby saving to the manufacturer the expense of feeders and plate-cutters.

I do not limit my invention to the kind of tack and nail or other fastening forming mechanisms herein shown, nor to the details of the feeding mechanism and other arrangements or construction of the machine, nor do I limit my invention otherwise than as set forth in the claims, inasmuch as many changes in form, proportions, and arrangements of parts may be resorted to without departing from the spirit and scope of my invention.

It is obvious that the relative positions of the three mechanisms constituting the machine may be widely varied, as may also the separate parts of each of said mechanisms. The alternate feeding may be accomplished by either the oscillating or the reciprocating movement or by some other movement, although I prefer the compound movement resulting from the employment of both of the described movements; nor is my invention restricted to the direction of feed herein shown and described, inasmuch as the wire or strip may be delivered at any angle desired relatively to the entire machine, and the cutting and forming tools may be set at such angles as may be necessary to correspond thereto.

I claim—

1. In a machine for manufacturing tacks and nails, two mechanisms for cutting the blank and forming the same into a finished tack or nail, combined with a pivoted feeding mechanism adapted to be oscillated from one of said mechanisms to the other to feed alternately to said two mechanisms the strip of metal from which said blanks are cut, substantially as described.

2. In a machine for manufacturing tacks and nails, two mechanisms for cutting the blank and forming the same into a finished tack or nail, combined with a pivoted feeding mechanism adapted to be oscillated from one of said mechanisms to the other to feed alternately the strip of metal from which said blanks are cut, and means to regulate the extent of said oscillatory movement, substantially as described.

3. In a machine for manufacturing tacks and nails, two mechanisms for cutting the blank and forming the same into a finished tack or nail, combined with a reciprocating slide, a carriage pivoted to said slide, and a feeding mechanism mounted upon said carriage, and adapted to oscillate about said pivot to alternately feed to each of said mechanisms the strip of metal from which said blanks are cut, substantially as described.

4. In a machine for manufacturing tacks and nails, two mechanisms for cutting the blank and forming the same into a finished tack or nail, combined with a reciprocating slide; mechanism for regulating the movement of said slide; a carriage pivoted to said slide, and a feeding mechanism mounted upon said carriage and adapted to oscillate about said pivot to alternately feed to each of said mechanisms the strip of metal from which said blanks are cut, substantially as described.

5. In a machine for manufacturing tacks and nails, two mechanisms for cutting the blank and forming the same into a finished tack or nail, combined with a reciprocating slide; mechanism for regulating the movement of said slide; a carriage pivoted to said slide, means to regulate the pivotal movement of said carriage, and a feeding mechanism mounted upon said carriage and adapted to oscillate about said pivot to alternately feed to each of said mechanisms the strip of metal from which said blanks are cut, substantially as described.

6. In a machine of the class described, a plurality of tack or nail forming mechanisms, and a common feeding mechanism for longitudinally feeding the metal strip to one and then another of said mechanisms, combined with independent regulating devices respectively for said forming mechanisms coöperating with said feeding mechanism to vary the longitudinal feed of the metal thereby as desired, and means to adjust said regulating devices, substantially as described.

7. In a machine of the class described, two tack or nail forming mechanisms, and a common feeding mechanism to feed the metal strip alternately to said two mechanisms, combined with pivoted feed-regulators, substantially as described.

8. In a machine of the class described, two tack or nail forming mechanisms, a common stock-feeding mechanism therefor, means to move the same at its feeding end to one and then to the other of said forming mechanisms, said feeding mechanism including a pawl-and-ratchet mechanism and a reciprocating bar operating the same, and inclined feed-regulators in the path of movement of said feeding mechanism and adapted to thereby reciprocate said bar, combined substantially as and for the purpose described.

9. The herein-described feeding mechanism, comprising a laterally-movable member, carrying feed-rolls and pawl-and-ratchet mechanism to operate said rolls, and being also provided with a reciprocating bar arranged to intermittingly actuate said pawl-and-ratchet mechanism, and inclined feed-regulators in the path of said lateral movement, and adapted to be engaged by said bar, thereby to reciprocate the said bar, substantially as described.

10. In a machine of the class described, two tack or nail forming mechanisms, and a feeding mechanism for alternately feeding the wire or strip to said forming mechanisms, combined with movable holders, and means for operating said holders alternately to clamp the wire or strip adjacent the respective forming mechanisms and positively hold the same until the required blank is cut therefrom, substantially as described.

11. In a machine of the class described, two tack or nail forming mechanisms, and a feeding mechanism for alternately feeding the wire or strip to said forming mechanisms, combined with a head arranged between said forming mechanisms, said head having at either end thereof a holder, and means to engage said holders alternately with the wire or strip adjacent the respective forming mechanisms and positively hold the same until the required blank is cut therefrom, substantially as described.

12. In a tack or nail forming machine, a pair of grippers, one of which is movable toward the other, said movable gripper being cut away on its face at one side, and a block arranged to rest against said cut-away surface to crowd over the point end of the tack or nail into properly-centered position, the movable gripper moving said block against the tack, substantially as described.

13. In a tack or nail making machine, a nose-piece through which the wire or strip is delivered, said nose-piece comprising two interlocking jaws having a confined guideway for accurately directing the said wire or strip, and means for maintaining said jaws in yielding engagement, substantially as described.

14. In a tack or nail forming machine, two coöperating cutting-tools, one of which is mounted in a movable cutting-jaw, and a coöperating carrier and finger, the former being mounted in a carrier-jaw adjacent said cutting-jaw, combined with a wedge-block operating against said jaws to actuate the same, said wedge-block having a dwell formed in the path of contact therewith of said cutting-jaw, whereby the carrier-jaw continues to be moved after the said cutting-jaw comes to rest, and means to retract said jaws, substantially as described.

15. In a tack or nail forming machine, two coöperating cutting-tools, one of which is mounted in a movable cutting-jaw, and a coöperating carrier and spring-controlled finger, the former being mounted in a carrier-jaw adjacent said cutting-jaw, combined with a wedge-block operating against said jaws to actuate the same, said wedge-block having a dwell formed in the path of contact therewith of said cutting-jaw, whereby the carrier-jaw continues to be moved after the said cutting-jaw comes to rest, and means to retract said jaws, substantially as described.

16. In a machine of the class described, two tack or nail forming mechanisms, combined with a common feeding mechanism for feeding metal stock alternately to said forming mechanisms, means to move the feeding end of said feeding mechanism laterally from its normal position first to one and then to the other of said forming mechanisms, and a yielding device tending to restore the said feeding end to its said normal intermediate position, substantially as described.

In testimony whereof I have signed my name to this specification in the presence of two subscribing witnesses.

CHARLES B. RUSSELL.

Witnesses:
RODOLPHUS C. WATERMAN,
GEO. H. MAXWELL.